United States Patent [19]

Haugh

[11] Patent Number: 5,022,030
[45] Date of Patent: Jun. 4, 1991

[54] SKEWED XOR DATA STORAGE PROCESS

[75] Inventor: Dennis Haugh, Colorado Springs, Colo.

[73] Assignee: Digital Equipment Corporation, Maynard, Mass.

[21] Appl. No.: 325,281

[22] Filed: Mar. 17, 1989

[51] Int. Cl.$^5$ .............................................. G06F 11/10
[52] U.S. Cl. ...................................... 371/51.1; 365/52; 365/53
[58] Field of Search ..................... 371/49.1, 51.1, 40.1, 371/40.4; 365/53, 51, 52

[56] References Cited

U.S. PATENT DOCUMENTS

| | | | |
|---|---|---|---|
| 3,303,482 | 2/1967 | Jenkins | 371/51.1 |
| 4,528,666 | 7/1985 | Cline et al. | 371/51.1 |
| 4,833,655 | 5/1989 | Wolf et al. | 371/51.1 |

Primary Examiner—Charles E. Atkinson
Attorney, Agent, or Firm—Neuman, Williams, Anderson & Olson

[57] ABSTRACT

A method and apparatus for writing and reading multiplexed data in a plurality of data storage systems, including skewed XOR data for improving data retrieval integrity with minimal write time.

22 Claims, 2 Drawing Sheets

SKEWED XOR DATA STORAGE PROCESS

FIELD OF THE INVENTION

The present invention relates to data preservation techniques, and more particularly to methods and apparatus for protecting against loss of data in multiple device dynamic storage arrays.

BACKGROUND OF THE INVENTION

In digital computer systems, it is common practice to use the exclusive or (XOR) relationship between corresponding bits of storage data to provide a foundation for detecting and correcting data errors when the stored data is retrieved. Typically, the XOR data is written in synchronization with corresponding written storage data from which it is generated. The XOR data is generally produced from a plurality of storage bits. These storage bits are simultaneously stored on a plurality of different data storage channels. These data storage channels may comprise different tracks of a single storage medium, or may comprise a plurality of completely separate, but synchronized, recording media. The XOR data is generated by reading the stored data and then making bit-by-bit comparisons of the stored data. The resulting XOR data is then recorded on a separate data storage channel in synchronization with the corresponding data bits on the data storage channels from which the XOR data is computed.

However, because of the computational delay required to produce the XOR data, the XOR data cannot be synchronously written on the same write cycle of the data storage medium as the corresponding written data bits. In the case of data storage discs, the XOR data must be written during a subsequent revolution of the disc in the same sector from which the stored data that was used to generate the XOR data is located. In this manner the XOR data is synchronized with the corresponding storage data from which it was generated. Consequently, the entire duration of the write process is the sum of the interval required for the written data, plus the "XOR latency", which is the interval required for XOR data computation and writing. The XOR latency in this case is the interval corresponding to a complete memory write cycle, such as a complete revolution on a successive pass of a data storage disc, so that the XOR data is properly synchronized on the disc.

For instance, for a particular data storage disc drive, the disc sector write interval may be 238 microseconds, and the interval for a complete pass, or revolution, of the disc may be 16.6 milliseconds. If a four sector write operation is performed, the total duration of the write process is 952 microseconds. When a single disc drive is so used, data storage integrity is sufficiently high to dispense with the XOR data. Thus, the total duration of the write process remains 952 microseconds. Of course, the total duration of the read process for this same written data is also 952 microseconds.

If the data to be written is spread over four disc drives, the four sector write operation is reduced to a single sector write operation. The decrease in reliability of data stored and retrieved with this multiple disc write operation mandates some form of data integrity enhancement, such as the XOR data generation described above. When the XOR data is used, an additional disc drive, synchronized with the other four, records the XOR data. However, the interval required to compute the XOR data prevents it from being recorded in synchronization with the corresponding data from which it is generated on the same pass of the synchronized discs. Instead, the XOR data is held until the next pass of the XOR data disc, and then the XOR data is written in synchronization with the corresponding data associated with the XOR data. As indicated above, the interval required for a complete revolution of the XOR disc in this case is 16.6 milliseconds. Therefore, the total write time for this scheme is 238 microseconds plus 16.6 milliseconds, or 16,838 microseconds. Of course, the total read time is considerably less, being 238 microseconds plus the XOR computational latency, which is a nominal value dependent upon the system hardware used.

Thus, it is apparent that a multiple data storage medium configuration, such as described above, can greatly improve system data rates for the read process, although the write process is considerably lengthened.

SUMMARY OF THE INVENTION

The present invention reduces the required duration of the write process to the range of that required for the read process, plus any XOR data computational latency. The reduction in the required duration of the write process is accomplished by "skewing" the XOR data which is written on the XOR data storage medium relative to the stored data from which the XOR data is generated. "Skewing" the XOR data means that the XOR data is written after a delay relative to the written data from which the XOR data is generated. This delay is equivalent to the interval required to generate the XOR data. The XOR data is permitted to be stored in this skewed condition, out of synchronization with the corresponding data from which it is generated, but the XOR data is resynchronized with its corresponding read data during the read process, using a selected resynchronization scheme. A resynchronization scheme is provided with digital delay lines for the read data or an offset read head used in connection with the XOR data storage medium.

DETAILED DESCRIPTION OF THE INVENTION

Figure 1:
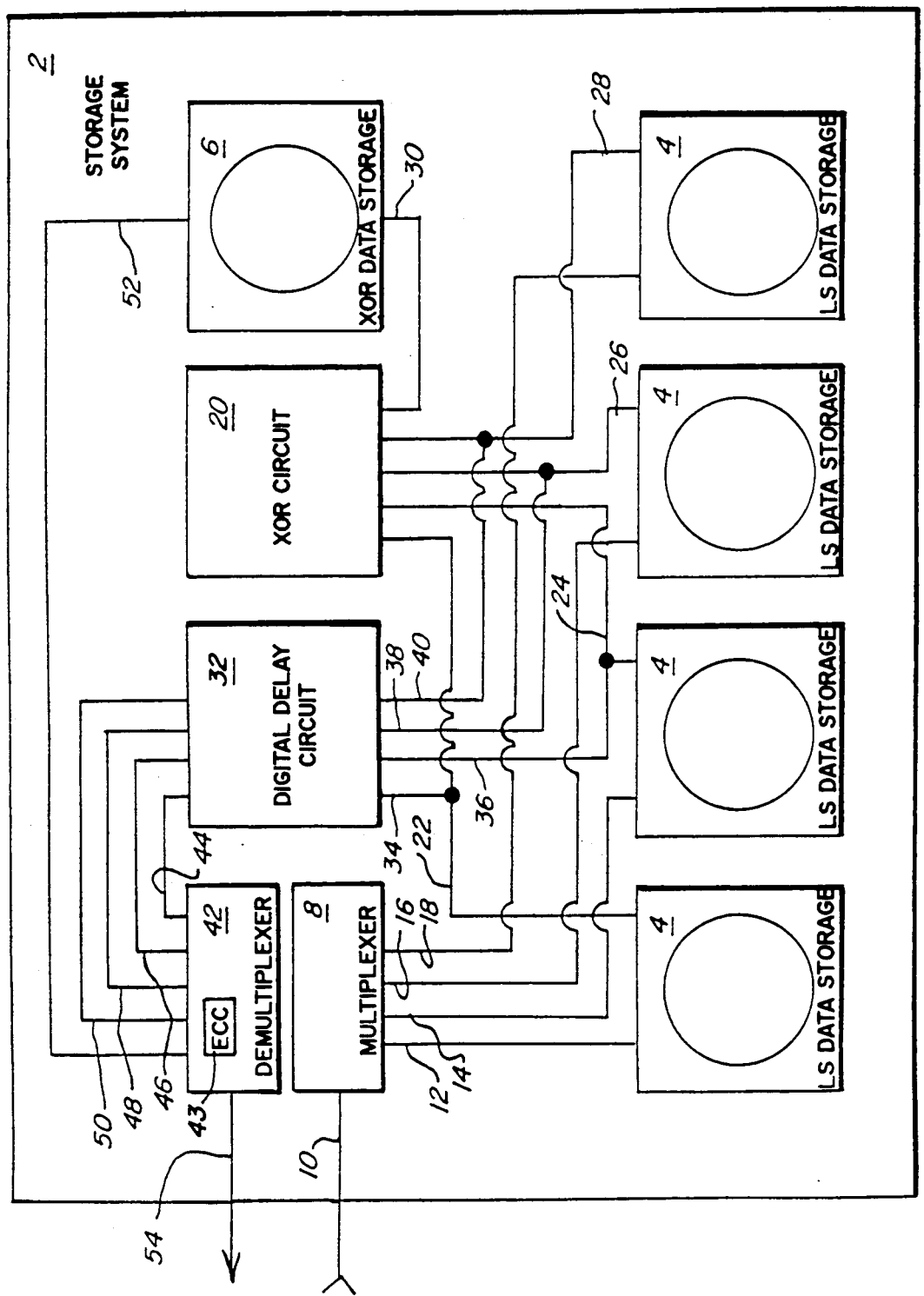
FIG. 1 is a multiple channel data storage system which includes a preferred embodiment of the invention.

Referring to the drawings, wherein like characters designate like or corresponding parts throughout the views, FIG. 1 shows a typical multiple channel data storage system 2 utilizing a different one of a plurality of low speed data storage units 4 for each data storage channel. Any number of the low speed data storage units 4 can be used, depending upon the desired data transfer speed requirements selected, and any recurrently cyclical storage medium can be utilized effectively, such as a magnetically or optically recorded disc or drum, or a semiconductive cyclomemory. The low speed data units 4 are shown to be of the magnetic disc type in FIG. 1. The data retrieval rate will increase proportionally to the number of low speed data storage units 4 which are added to the system 2. The reason for this is that the data to be stored may be written over a smaller number of sectors on each disc, since the data is spread out among the low speed data units 4. Of course, as explained above, to increase the reliability of the storage system 2, an XOR data storage unit 6 is also included. The XOR data storage unit 6 is conveniently a unit which is substantially identical with the low speed data storage drive units 4. A data storage system multiplexer 8 divides incoming high speed data on a line 10 into four low speed data signals on respective multiplexer output lines 12, 14, 16 and 18. The data multiplexer 8 may be any well known configuration for converting a high speed data input to a plurality of low speed data outputs.

The low speed data is recorded on the low speed data units 4 and is also read as it is written. The read data from each of the low speed data storage units 4 is transferred to an XOR circuit 20 via low speed data storage unit output lines 22, 24, 26 and 28 respectively. The XOR circuit 20 may use any well known configuration to provide a bit-by-bit XOR relationship for the read data transferred from each of the low speed data storage units 4 on the lines 22, 24, 26 and 28, respectively. The XOR circuit 20 provides an XOR output signal representing this bit-by-bit XOR comparison to the XOR data drive 6 via an XOR output line 30.

Thus, a high speed data signal on the line 10 is converted by the multiplexer 8 into four low speed data signals, which low speed signals are transferred to each of the low speed data storage units 4 via the multiplexer output lines 12, 14, 16 and 18 respectively. The low speed data storage units 4 are synchronized with each other so that data transfers to and storage in the low speed data storage units 4 are retrievable with some degree of reliability. However, to increase reliability, the four low speed data signals written on the low speed data storage units 4 are read from the low speed data storage units 4 as they are written, and the read signals are transferred to the XOR circuit 20 from each one of the low speed data storage units 4 via the XOR input lines 22, 24, 26 and 28 respectively. The XOR circuit 20 performs a bit-by-bit XOR comparison on the received low speed read signals and produces the XOR output signal, and transfers it to the XOR data storage unit 6 via the XOR output line 30.

The known procedures for computing the XOR relationship in the XOR circuit 20 involve a significant delay period. Thus, although it is desirable to provide the XOR data storage unit 6 with the same characteristics as the low speed data storage units 4, the computational delay involved in producing the XOR output signal on the line 30 prevents the XOR output signal from being recorded in phase with the corresponding low speed data written on the low speed data storage units 4 from which the XOR data is generated.

However, it is only necessary that the XOR data read from the XOR data storage unit 6 be processed in synchronization with the low speed data read from the low speed data storage units 4 when data is to be retrieved from storage. Therefore, the XOR data may be written in a skewed relationship relative to its corresponding low speed data, as long as the read XOR data is properly synchronized with its corresponding low speed read data when retrieved from storage. The XOR data may then be written in the XOR data storage unit 6 as soon as the computation of the XOR data is complete. Consequently, the XOR latency interval is effectively reduced to the delay incurred with the XOR data computation alone. By shifting the synchronization process from the data writing stage to the data reading stage, the duration of the data write process is substantially reduced.

The synchronization of the low speed read data from the low speed storage units 4 with the corresponding XOR read data from the XOR data storage unit 6 may be achieved with a variety of methods and circuit configurations. For instance, in FIG. 1, the low speed data read from the low speed data storage units 4 is transferred to a four channel digital delay circuit 32 via delay circuit input lines 34, 36, 38 and 40, which are respectively fed by the XOR input lines 22, 24, 26 and 28. The four channel delay circuit 32 includes a delay for each of its channels which is sufficient to synchronize the respective low speed read data passing through it with the corresponding XOR read data. The delay will approximate the computational delay required to generate the XOR data which has been written.

As an example, for the case in which each of the four low speed data storage units 4 and the XOR data storage unit 6 are all of the disc type, having one complete revolution every 16.6 milliseconds and data sectors with a sector period of about 238 microseconds, the XOR circuit 20 computational delay will be somewhat less than one sector interval, or 238 microseconds. Thus, a digital delay circuit 32 which includes a 238 microsecond delay for each of its four channels will be sufficient to synchronize the respective low speed read data from the low speed data storage units 4 with the XOR read data from the XOR data storage unit 6. The digital delay circuit 32 may use any well known configuration for the selected delay, such as digital delay lines.

Each of the four read data outputs from the four channel digital delay circuit 32 are transferred to a data storage system demultiplexer 42 via the demultiplexer input lines 44, 46, 48 and 50 respectively. The read data output from the XOR data storage unit 6 is also transferred to the demultiplexer 42 via an XOR data output line 52. The demultiplexer 42 processes the four delayed low speed read data signals received on the lines 44, 46, 48 and 50 to convert them to a single high speed data output signal, which high speed data output signal appears on a demultiplexer output line 54. The demultiplexer 42 also includes error detection and correction circuitry 43 which senses any errors in the incoming low speed read data on the lines 44, 46, 48 and 50, with the XOR read data on the line 52 and corrects the error-containing low speed read data.

For example, if the incoming high speed data on the line 10 feeding the multiplexer 8 has a duration such that each of the low speed data storage units receive a one sector duration of low speed data on from the respective multiplexer 8 output lines 12, 14, 16 and 18, the write process duration for this low speed data on the low speed drives 4 is 238 microseconds. The XOR circuit 20 immediately retrieves the written low speed data on each of the low speed data storage units 4 via the lines 22, 24, 26 and 28, respectively, and computes the corresponding XOR data as described above.

Although the XOR computational latency for the XOR circuit 20 is a variable which depends upon the specific configuration of the XOR circuit 20 which is adapted, this XOR computational latency is easily reduced to a fraction of the duration of the corresponding data from which it is computed, or less than 238 microseconds, in this instance. The XOR data is then transferred to the XOR data storage unit 6 via the line 30 for writing onto its corresponding medium with a skew corresponding to the duration of the XOR computational process, which is less than 238 microseconds, as explained above. Therefore, the complete write process can be completed in less than 476 microseconds. The total duration of the read process for the above described written low speed data and corresponding XOR data is only the interval between the beginning of the low speed data and the end of the corresponding skewed XOR data. Thus, the total read process time is the same as described above, less than 476 microseconds.

Figure 2:
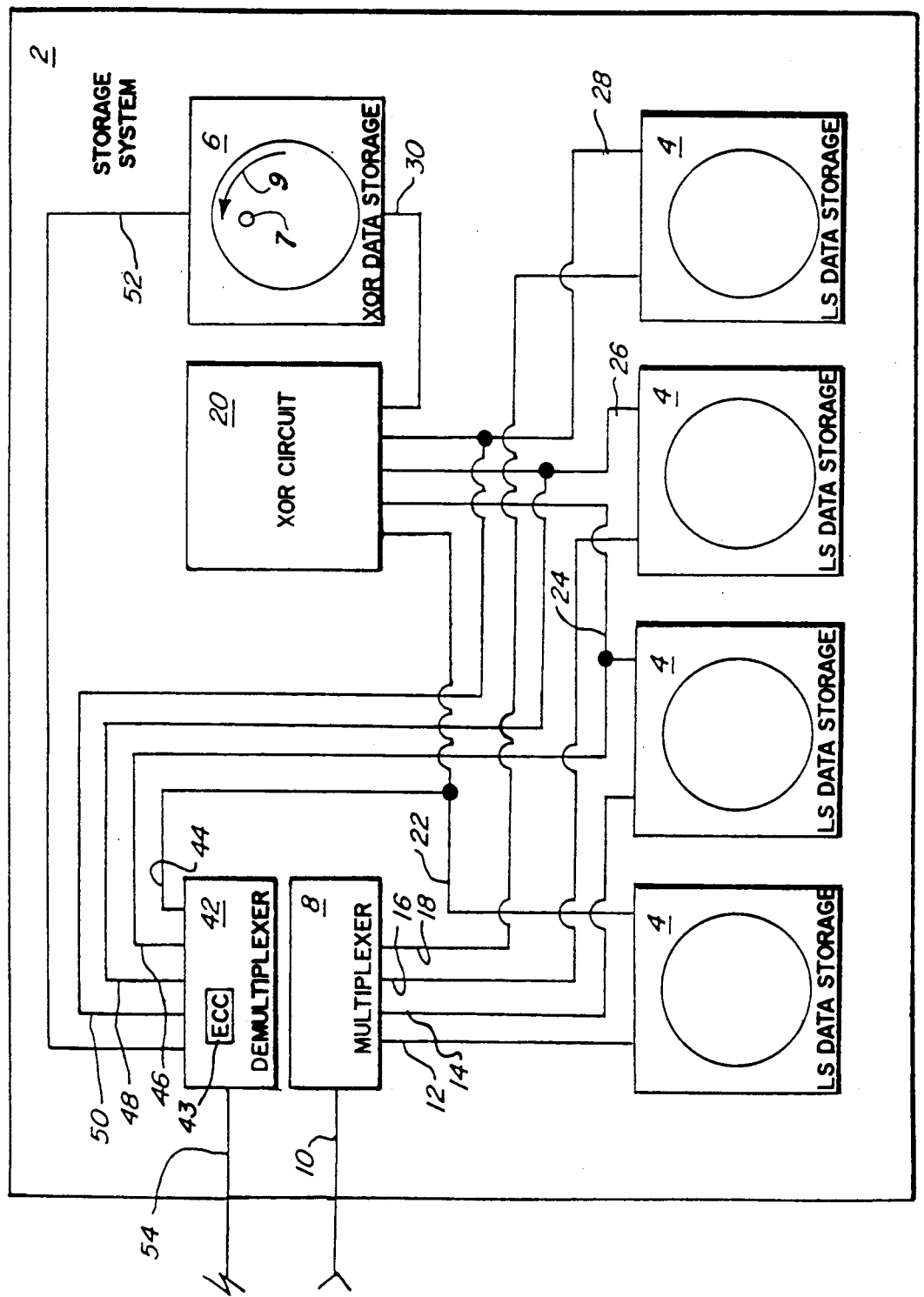
FIG. 2 is a multiple channel data storage system including an alternate embodiment of the invention.

Alternatively, the digital delay circuit 32 may be deleted if the XOR read data signal from the line 52 is otherwise advanced relative to the low speed read data signals on the lines 34, 36, 38 and 40. For instance, in FIG. 2, the multiple channel digital storage system 2 may be arranged as described above in connection with FIG. 1, but the XOR data storage unit 6 is modified to provide an XOR read data signal which is advanced by the desired delay relative to the low speed read data signals from the low speed data storage units 4 on the lines 44, 46, 48 and 50, such as by relatively advancing the position of an offset read transducer 7 in the XOR data storage unit 6 compared to the respective read transducers in the low speed data storage units 4. The offset is represented by a curved arrow 9. In this case, the lines 44, 46, 48 and 50 feed the low speed read data signals directly into the demultiplexer 42 from the low speed data storage units 4, since the synchronization of the low speed read data signals with the XOR read data signal is accomplished with repositioning of the read head in the XOR data storage unit 6. This embodiment of the invention allows the XOR data to be read simultaneously with the corresponding low speed data, so that the total read process duration, for the example described above in connection with the preferred embodiment of the invention, is only 238 microseconds. However, this embodiment requires that a special offset read head configuration be used in the XOR data storage medium 6.

Of course, still other procedures can be used for synchronizing the skewed XOR data signal which is written on the XOR data storage unit 6 with the corresponding low speed data. For instance, the storage medium in the XOR data storage unit 6 may be allowed to advance the corresponding positions of the storage media in each of the low speed data storage units 4 during the read process by an amount corresponding to the desired delay. So too, the storage media in the low speed data storage units 4 may each be retarded relative to the position of the storage medium in the XOR data storage unit 6 during the read process by an amount corresponding to the desired delay.

In any case, the above described procedures allow the XOR data to be written as soon as possible after the corresponding low speed multiplexed data is written, and yet retrieved in synchronization during the read process. Thus, the writing speed of the entire multiple channel data storage system 2 is enhanced. For the instance described above, the write process may be completed within the interval of less than one storage medium revolution, for a disc or drum drive, and typically within an interval of less than two data field sectors of one revolution.

The total required duration of the write process is the actual data write interval of 238 microseconds plus the XOR latency, which is an integer fraction of the sector period equal to, or higher than, the computational interval required for the XOR data corresponding to the multiple channel low speed data. This XOR computational interval is a factor which is variable, and depends upon specific implementation, as explained above, but it is easily implemented as less than one sector period. Thus, the XOR data will be written with a skew of one sector period or less, rather than one complete revolution later, or 16.6 milliseconds later for the example described above, according to procedures of the prior art.

It will be understood that various changes in the details, arrangements and configurations of the parts and systems which have been described and illustrated above in order to explain the nature of the present invention may be made by those skilled in the art within the principle and scope of the present invention as expressed in the appended claims.

What is claimed is:

1. A method of storing and retrieving high speed data information with a plurality of low sped data storage channels comprising the steps of multiplexing a high speed data signal into a selected number of low speed data signals, storing each one of said low speed data signals on a separate data storage channel, retrieving each of said stored low speed data signals from each respective one of said data storage channels, comparing said data in each of said retrieved low speed data signals in an exclusive or (XOR) relationship to form an XOR data signal, and minimizing write process data transfer time comprising the steps of:

storing said XOR data signal on an XOR data storage channel out of synchronization with said corresponding low speed data stored in said low speed data storage channels;

synchronously retrieving said stored low speed data signals from said low speed data storage channels and said stored XOR data signal from said XOR data storage channel; and demultiplexing said retrieved low speed data signals to restore said high speed data signal.

2. The method recited in claim 1, wherein said step of synchronously retrieving said stored low speed data signals and said stored XOR data signal further comprises the step of delaying said low speed data signals to synchronize said XOR data signal with said corresponding low speed data signals.

3. The method recited in claim 2, wherein said step of delaying said low speed data signals includes delaying said low speed data signals for an interval corresponding to the difference in time between said retrieved low speed data signals and said retrieved XOR data signal.

4. The method recited in claim 1, wherein said step of synchronously retrieving said stored low speed data signals and said stored XOR data signal further comprises the step of recovering said XOR data signal before said corresponding low speed data signals.

5. The method recited in claim 4, wherein said step of recovering said XOR data signal further comprises the step of extracting said XOR data from said XOR data storage channel at an XOR data extraction point and the step of extracting said low speed data from said low speed data storage channels at respective low speed data extraction points that lag said XOR data extraction point in a skewed relationship.

6. The method recited in claim 5, wherein said low speed data is extracted from said low speed data extraction points on said respective data storage channels relative to said XOR data extraction point a distance corresponding to a storage medium transit period which correlates with the difference in time between said stored XOR data and said corresponding stored low speed data.

7. A method of storing and retrieving high speed data information with a plurality of low speed data storage channels, comprising the steps of multiplexing a high speed data signal into a selected number of low speed data signals, storing each one of said low speed data signal on a separate data storage channel, retrieving each of said stored low speed data signals from each respective one of said data storage channels, comparing said data in each of said retrieved low speed data signals in an exclusive or (XOR) relationship to form an XOR data signal, and minimizing write process data transfer time comprising the steps of:

storing said XOR data signal on an XOR data storage channel out of synchronization with said corresponding low speed data on said low speed data storage channels;

retrieving said stored low speed data from said low speed data storage channels;

retrieving said stored XOR data signal from said XOR data storage channel advanced relative to said corresponding low speed data on said low speed data storage channels;

synchronizing said retrieved XOR data signal with said corresponding retrieved low speed data signals; and demultiplexing said retrieved low speed data signals to restore said high speed data signal.

8. The method recited in claim 7, wherein said step of storing said XOR data signal includes storing said XOR data signals out of synchronization with said corresponding low speed stored data signals on said low speed data storage channels by a distance corresponding to a storage medium transit interval which correlates with the interval between the time said low speed data is written on said low speed data channels and the time said corresponding XOR data is formed.

9. The method as recited in claim 8, wherein said step of synchronizing further comprises the step of delaying said retrieved low speed data signals by said storage medium transit period.

10. The method recited in claim 8, wherein said step of synchronizing further comprises the step of extracting said retrieved XOR data signal from said XOR data storage channel at an XOR data extraction point and the step of extracting said low speed data from low speed data storage channels at respective low speed data extraction points that lag said XOR data extraction point in a skewed relationship.

11. The method recited in claim 10, wherein said step of extracting said low speed data includes extracting said low speed data from said respective low speed data extraction points on said respective data storage channels a distance corresponding to said storage medium transit interval.

12. A system for storing and retrieving high speed data information with a plurality of low speed data storage channels, comprising means for multiplexing a high speed data signal into a selected number of low speed data signals, means for storing each one of said low speed data signals on a separate one of said data storage channels, means for retrieving each of said stored low speed data signals from each respective one of said data storage channels, means for comparing said data in each of said retrieved low speed data signals in an exclusive or (XOR) relationship to form an XOR data signal, and means for minimizing write process data transfer time comprising:

means for storing said XOR data signal on an XOR data storage channel out of synchronization with said corresponding low speed data stored in said low speed data storage channels;

means for synchronously retrieving said stored low speed data signals from said low speed data storage channels and said stored XOR data signal from said XOR data storage channel; and means for demultiplexing said retrieved low speed data signals to restore said high speed data signal.

13. A system for storing and retrieving high speed data information having a plurality of low speed data storage channels, means for multiplexing a high speed data signal into a selected number of low speed data signals, means for storing each one of said low speed data signals on a separate data storage channel, means for retrieving each of said stored low speed data signals from each respective one of said data storage channels, means for comparing said data in each of said retrieved low speed data signals in an exclusive or (XOR) relationship to form an XOR data signal, and means for minimizing write process data transfer duration comprising:

means for storing said XOR data signal on an XOR data storage channel out of synchronization with said corresponding low speed data on said low speed data storage channels;

means for retrieving said stored low speed data from said low speed data storage channels;

means for retrieving said stored XOR data signal from said XOR data storage channel on said XOR data storage channel;

means for synchronizing said retrieved XOR data signal from said means for retrieving said XOR data signal with said corresponding retrieved low speed data signals from said means for retrieving said low speed data signals; and means for demultiplexing said retrieved low speed data signals to restore said high speed data signal.

14. The system recited in claim 16, wherein said means for storing said low speed data and means for retrieving said low speed data comprise low speed data storage disc drives.

15. The system recited in claim 17, wherein said means for storing said XOR data and means for retrieving said stored XOR data comprise an XOR data storage disc drive.

16. The system recited in claim 15, wherein said means for synchronizing comprises a delay circuit for each of said retrieved low speed data signals.

17. The system recited in claim 16, wherein each said delay circuit includes a delay corresponding to a storage transit interval representing the interval between the time said low speed data is written on said low speed storage disc drive and said corresponding XOR data is written on said XOR data storage disc drive.

18. The system recited in claim 15, wherein said means for synchronizing comprises an XOR data storage disc read head for said XOR data storage disc drive arranged to retrieve said stored XOR data upstream from said corresponding stored low speed data retrieved from said low speed data storage disc drives.

19. A system for storing and retrieving high speed data information with a plurality of low speed data storage channels, comprising a data multiplexer for multiplexing a high speed data signal into a selected number of low speed data signals, a plurality of low speed data storage disc drives for storing and retrieving each one of said low speed data signals on a separate data storage channel, an exclusive or (XOR) network for generating an XOR relationship to form an XOR data signal, and means for minimizing write process data transfer duration comprising:

an XOR data storage disc drive for storing said XOR data signal on an XOR data storage channel out of synchronization with said corresponding low speed data signals stored on said low speed data storage disc drives and for retrieving said stored XOR data signal from said XOR data storage channel;

means for synchronizing said retrieved XOR data signal from said XOR data storage disc drive with said corresponding retrieved low speed data signals from said low speed data storage disc drives; and a data demultiplexer for demultiplexing said retrieved low speed data signals to restore said high speed data signal.

20. The apparatus recited in claim 19, wherein said means for synchronizing comprise a delay circuit for each of said retrieved low speed data signals.

21. The apparatus recited in claim 20, wherein each said delay circuit includes a delay corresponding to a storage transit interval representing the interval between the time said low speed data is written on said low speed data storage disc drives and said corresponding XOR data is written on said XOR data storage disc drive.

22. The apparatus recited in claim 19, wherein said means for synchronizing comprises an XOR data storage disc read head for said XOR data storage disc drive arranged to retrieve said stored XOR data at an XOR data extraction point in said XOR data storage disc drive ahead of respective low speed data extraction points in said low speed data storage disc drives for retrieving said corresponding stored low speed data retrieved from said low speed data storage disc drives.

* * * * *